US008728643B2

(12) United States Patent
Byun (10) Patent No.: US 8,728,643 B2
(45) Date of Patent: May 20, 2014

(54) FUSE UNIT FOR RECHARGEABLE BATTERY WITH SUPPORTING MEMBER

(75) Inventor: Sang-Won Byun, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/548,082

(22) Filed: Jul. 12, 2012

(65) Prior Publication Data

US 2013/0143080 A1 Jun. 6, 2013

(30) Foreign Application Priority Data

Dec. 6, 2011 (KR) ........................ 10-2011-0129665

(51) Int. Cl.
*H01M 2/02* (2006.01)
*H01M 2/00* (2006.01)

(52) U.S. Cl.
USPC ............................................. 429/61; 429/62

(58) Field of Classification Search
USPC .................................................... 429/61–62
See application file for complete search history.

(56) References Cited

U.S. PATENT DOCUMENTS

| 6,218,040 B1* | 4/2001 | Romero ........................... 429/61 |
| 6,899,972 B2* | 5/2005 | Cho ................................. 429/61 |
| 2004/0096732 A1* | 5/2004 | Shin et al. ....................... 429/61 |
| 2004/0126650 A1* | 7/2004 | Kim .................................. 429/61 |
| 2004/0196133 A1 | 10/2004 | Kawanishi |
| 2006/0115725 A1* | 6/2006 | Kim ............................... 429/174 |
| 2011/0305928 A1* | 12/2011 | Kim et al. ....................... 429/61 |

FOREIGN PATENT DOCUMENTS

| JP | 2004-311080 A | 11/2004 |
| JP | 2006-012602 A | 1/2006 |

* cited by examiner

*Primary Examiner* — Milton I Cano
*Assistant Examiner* — Michael Dignan
(74) *Attorney, Agent, or Firm* — Christie, Parker & Hale, LLP (57) ABSTRACT

A rechargeable battery including: an electrode assembly; a case having an opening to receive the electrode assembly; a cap plate covering the opening of the case; a terminal arranged at the cap plate and electrically connected to the electrode assembly; a current collecting member coupled to the electrode assembly and the terminal and including a fuse unit; and a supporting member coupled to the current collecting member and supporting the fuse unit.

12 Claims, 8 Drawing Sheets

FUSE UNIT FOR RECHARGEABLE BATTERY WITH SUPPORTING MEMBER

CROSS-REFERENCE TO RELATED APPLICATION

This application claims priority to and the benefit of Korean Patent Application No. 10-2011-0129665, filed on Dec. 6, 2011 in the Korean Intellectual Property Office, the entire content of which is incorporated herein by reference.

BACKGROUND

1. Field

Aspects of embodiments of the present invention relate to a rechargeable battery.

2. Description of the Related Art

A rechargeable battery is a battery that can be recharged and discharged, unlike a primary battery that cannot be recharged. A low-capacity rechargeable battery may be used for small portable electronic devices, such as a mobile phone, a notebook computer, and a camcorder, and a large-capacity rechargeable battery may be used as a power supply for driving a motor of an electric vehicle, a hybrid vehicle, or the like, or as a large-capacity power storage device.

Recently, a high-output rechargeable battery using a non-aqueous electrolyte solution of high energy density has been developed. The high-output rechargeable battery is configured as a large-capacity battery module in which a plurality of rechargeable batteries are connected to each other in series, such that the high-output rechargeable battery may be used to drive a motor of a device requiring a large amount of power, such as an electric vehicle, a hybrid vehicle, or the like. The rechargeable battery may have a cylindrical shape, a rectangular shape, or the like.

In the rechargeable battery using a non-aqueous electrolyte solution, an abnormal current may be generated inside the rechargeable battery during a time that the charge and the discharge are repeated such that the rechargeable battery may explode.

Accordingly, to prevent the explosion of the rechargeable battery by the abnormal current, a positive electrode and a negative electrode may be shorted or a fuse unit including a fuse hole may be installed to a current collecting member electrically connecting the terminal and the electrode assembly to prevent or substantially prevent a flow of the current.

However, the fuse unit of the current collecting member including the fuse hole has a smaller cross-sectional area compared with other current collecting members without the fuse hole. Accordingly, a portion formed with the fuse unit of the current collecting member may be more easily damaged by an external impact.

Also, an arc may be generated at the fuse unit by a remaining current after the fuse unit is partially melted by the abnormal current.

The above information disclosed in this Background section is only for enhancement of understanding of the background of the described technology and therefore it may contain information that does not form the prior art that is already known in this country to a person of ordinary skill in the art.

SUMMARY

According to an aspect of embodiments of the present invention, a rechargeable battery is configured to prevent or substantially prevent damage to a current collecting member formed with a fuse unit by an external impact. According to another aspect of embodiments of the present invention, a rechargeable battery includes a supporting member which improves durability.

According to another aspect of embodiments of the present invention, a rechargeable battery is configured to prevent or substantially prevent generation of an arc by a remaining current or stress after the fuse unit formed at the current collecting member is partially melted.

A rechargeable battery according to an exemplary embodiment of the present invention includes: an electrode assembly; a case having an opening to receive the electrode assembly; a cap plate covering the opening of the case; a terminal arranged at the cap plate and electrically connected to the electrode assembly; a current collecting member coupled to the electrode assembly and the terminal and including a fuse unit; and a supporting member coupled to the current collecting member and supporting the fuse unit.

In one embodiment, the current collecting member may include a terminal coupling unit coupled to the terminal, and an electrode assembly coupling unit coupled to the electrode assembly, the terminal coupling unit may include the fuse unit, and the supporting member may be coupled to the terminal coupling unit thereby supporting the fuse unit.

A cross-sectional area of the fuse unit may be less than that of other portions of the terminal coupling unit.

The fuse unit may have an opening formed therein.

The supporting member may include a supporting protrusion inserted in the opening.

The supporting protrusion may include an insulating material.

The supporting protrusion may include a high-resistance material.

The rechargeable battery may further include a supporting cap coupled to the supporting member and supporting the fuse unit.

The supporting cap may include a body unit and a coupling groove formed in the body unit, and the supporting member may be coupled to the supporting cap in the coupling groove.

The fuse unit may have an opening formed therein, and the supporting cap may include a coupling protrusion inserted in the opening.

The supporting cap may include an insulating material.

The supporting cap may include a high-resistance material.

The rechargeable battery may further include a lower insulating member between the cap plate and the current collector. The lower insulating member may include a protrusion inserted in an opening of the fuse unit.

The rechargeable battery may be adapted for use as a motor-driving power source for propelling an electric vehicle or a hybrid electric vehicle.

According to an aspect of embodiments of the present invention, the current collector formed with the fuse unit may be stably supported by the supporting member. As such, a rechargeable battery according to embodiments of the present invention is particularly suited for application in an electric vehicle or a hybrid electric vehicle.

According to another aspect of embodiments of the present invention, an arc generated by a remaining current after the fuse unit is melted or partially melted may be prevented or substantially prevented.

BRIEF DESCRIPTION OF THE DRAWINGS

The accompanying drawings, together with the specification, illustrate some exemplary embodiments of the present invention, and, together with the description, serve to explain aspects and principles of the present invention.

| Description of Reference Numerals Indicating Some Elements in the Drawings | |
|---|---|
| 100, 200, 300: rechargeable battery | 10: electrode assembly |
| 11: first electrode | 12: second electrode |
| 13: separator | 30: first terminal unit |
| 31: first rivet | 32: first terminal plate |
| 33: first terminal insulating member | 40: second terminal unit |
| 50: first current collecting member | 51: first electrode coupling unit |
| 52: first terminal coupling unit | |
| 60, 610, 620, 630: first lower insulating member | |
| 61, 611, 621, 631: first current collecting member coupling unit | |
| 70: second current collecting member | 80: second lower insulating member |
| 90: supporting member | |

DETAILED DESCRIPTION

The present invention is described more fully hereinafter with reference to the accompanying drawings, in which some exemplary embodiments of the invention are shown and described. However, as those skilled in the art would realize, the described embodiments may be modified in various different ways, all without departing from the spirit or scope of the present invention. Accordingly, the drawings and description are to be regarded as illustrative in nature and not restrictive.

Figure 1:
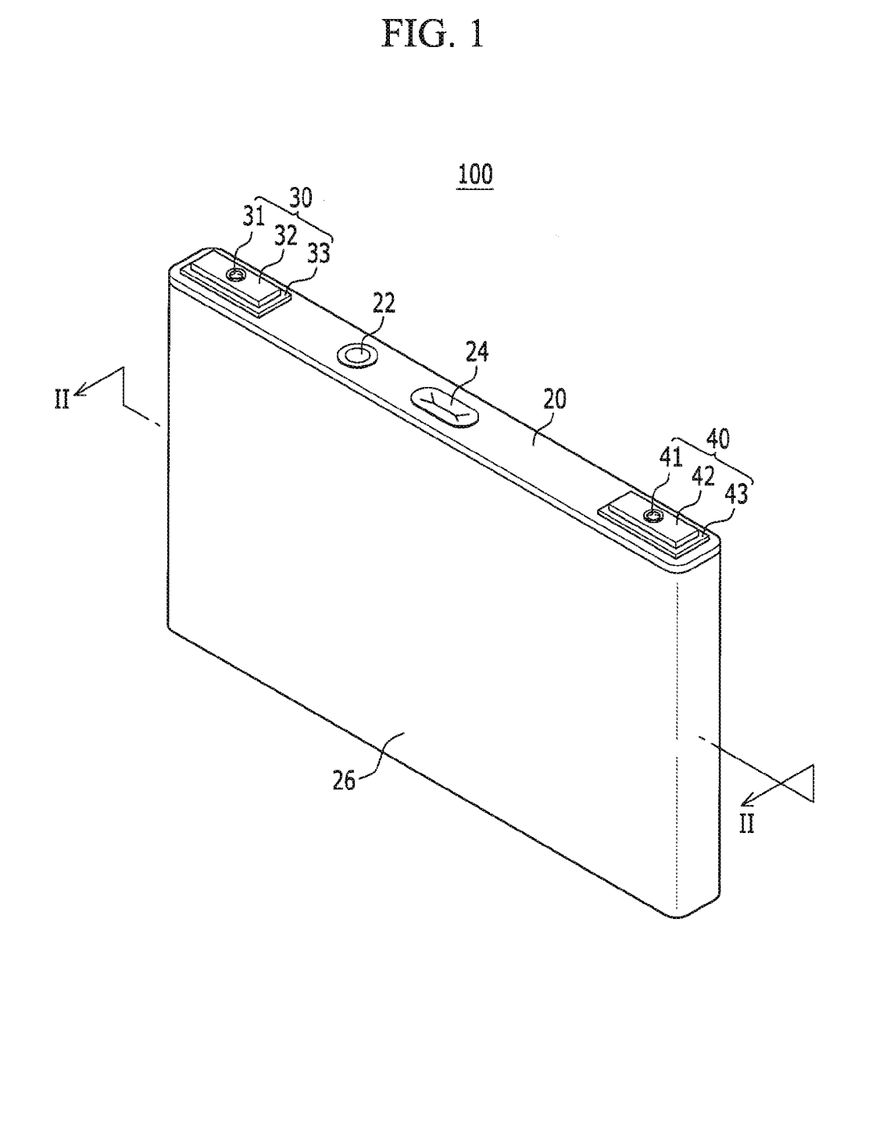
FIG. 1 is a perspective view of a rechargeable battery according to an exemplary embodiment of the present invention.
Figure 2:
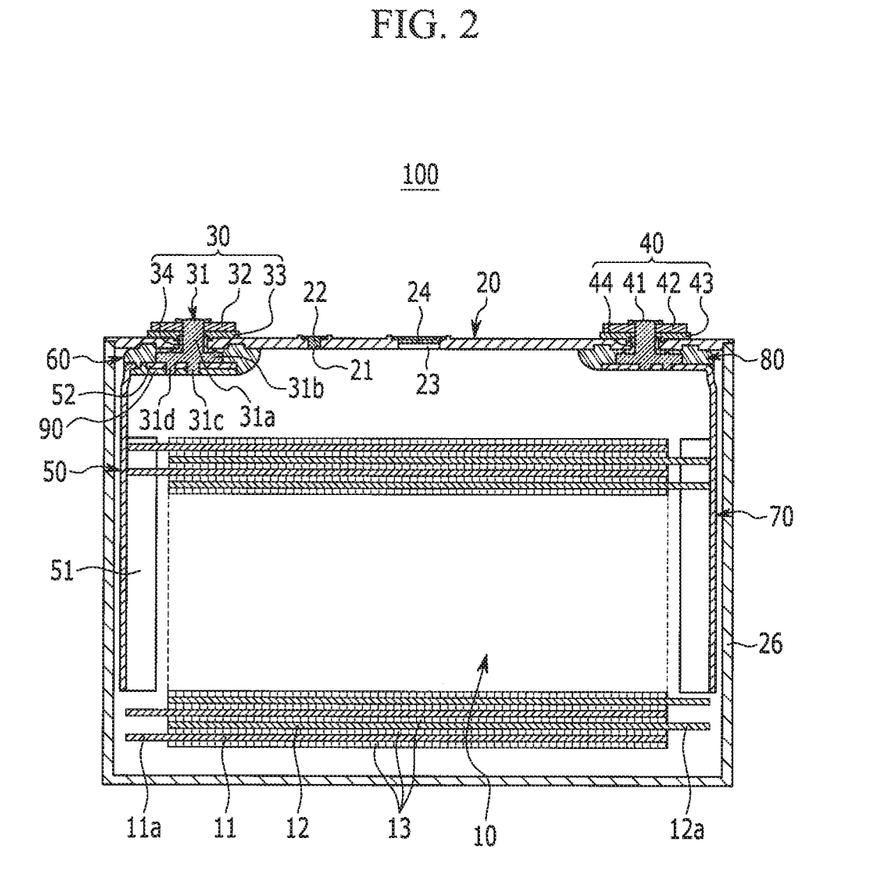
FIG. 2 is a cross-sectional view of the rechargeable battery of FIG. 1, taken along the line II-II.

FIG. 1 is a perspective view of a rechargeable battery according to an exemplary embodiment of the present invention, and FIG. 2 is a cross-sectional view of the rechargeable battery of FIG. 1, taken along the line II-II.

Referring to FIG. 1 and FIG. 2, a rechargeable battery 100 according to an exemplary embodiment of the present invention includes an electrode assembly 10, a case 26, a first terminal unit 30, a second terminal unit 40, a cap plate 20, first and second lower insulating members 60 and 80, first and second current collecting members 50 and 70, and a supporting member 90.

The rechargeable battery 100 according to one embodiment may be a lithium ion rechargeable battery. Also, a rectangular rechargeable battery is described herein by way of example. However, the present invention is not limited thereto, and may be applied to another rechargeable battery, such as a lithium polymer battery or other battery, as well as to a battery other than a rectangular rechargeable battery.

The electrode assembly 10, in one embodiment, may be formed as a jelly roll type by spirally winding a first electrode 11 and a second electrode 12 with a separator 13 interposed therebetween.

In one embodiment, the first electrode 11 may be formed as a negative electrode, and the second electrode 12 may be formed as a positive electrode. However, in another embodiment, the first electrode 11 may be formed as a positive electrode, and the second electrode 12 may be formed as a negative electrode. However, for purposes of description herein, they will be described as the first electrode 11 and the second electrode 12.

In one embodiment, the first electrode 11 and the second electrode 12 may respectively include first and second current collectors formed as a thin metal foil with an active material coated on a surface of the respective current collector.

In one embodiment, the first electrode 11 and the second electrode 12 may include a coated part on which the active material is coated on the respective current collector, and a first electrode uncoated region 11a and a second electrode uncoated region 12a on which the active material is not coated on the respective current collector.

The coated parts form a substantial portion of the first electrode 11 and the second electrode 12 in the electrode assembly 10, and the first electrode uncoated region 11a and the second uncoated region 12a are disposed at respective sides of the coated parts in the jelly roll state.

However, the present invention is not limited thereto. For example, in another embodiment, the electrode assembly 10 may have a structure in which the first electrode 11 and the second electrode 12 formed of a plurality of sheets are stacked, having the separator 13 therebetween.

As shown in FIG. 2, the first electrode uncoated region 11a of the electrode assembly 10 is electrically connected to the first terminal unit 30 via the first current collecting member 50, and the second electrode uncoated region 12a is electrically connected to the second terminal unit 40 via the second current collecting member 70.

In one embodiment, the first current collecting member 50 may include a first electrode coupling unit 51 coupled with the first electrode 11, and a first terminal coupling unit 52 coupled with a first rivet 31 of the first terminal unit 30.

The case 26, according to one embodiment, has a generally rectangular parallelepiped shape and includes an opening formed at one end thereof. However, the present invention is not limited thereto, and in other embodiments, the case may have any of various shapes, such as a cylindrical shape, a pouch shape, or any other suitable shape.

In one embodiment, the cap plate 20 may include an electrolyte injection opening 21, a sealing cap 22 sealing the electrolyte injection opening 21, and a vent hole 23 installed with a vent plate 24.

The cap plate 20, in one embodiment, is made of a thin plate and is coupled with the opening of the case 26 such that the opening is closed and sealed. The electrolyte solution may be inserted inside the closed and sealed case 26 through the electrolyte injection opening 21, and the vent plate 24 may be configured to be broken when an internal pressure of the case 26 is greater than a certain pressure (e.g., a predetermined value).

In one embodiment, the first and second terminal units 30 and 40 may respectively include first and second rivets 31 and 41, first and the second terminal plates 32 and 42, first and second terminal insulating members 33 and 43 installed between the first and second terminal plates 32 and 42 and the cap plate 20, and first and second gaskets 34 and 44.

The first and second terminal units 30 and 40 may include a terminal (not shown) made of a circular cylindrical shape rather than a terminal of a plate type.

The first and second lower insulating members 60 and 80 may be positioned and installed adjacent to the cap plate 20 inside the case 26.

The supporting member 90 according to one embodiment is coupled with the first current collecting member 50 to support the first current collecting member 50.

In one embodiment, structures of the first and second terminal units 30 and 40, structures of the first and second current collecting members 50 and 70, and structures of the first and second lower insulating members 60 and 80 are the same or similar, and, therefore, descriptions of the second terminal unit 40, the second current collecting member 70, and the second lower insulating member 80 are omitted.

Figure 3:
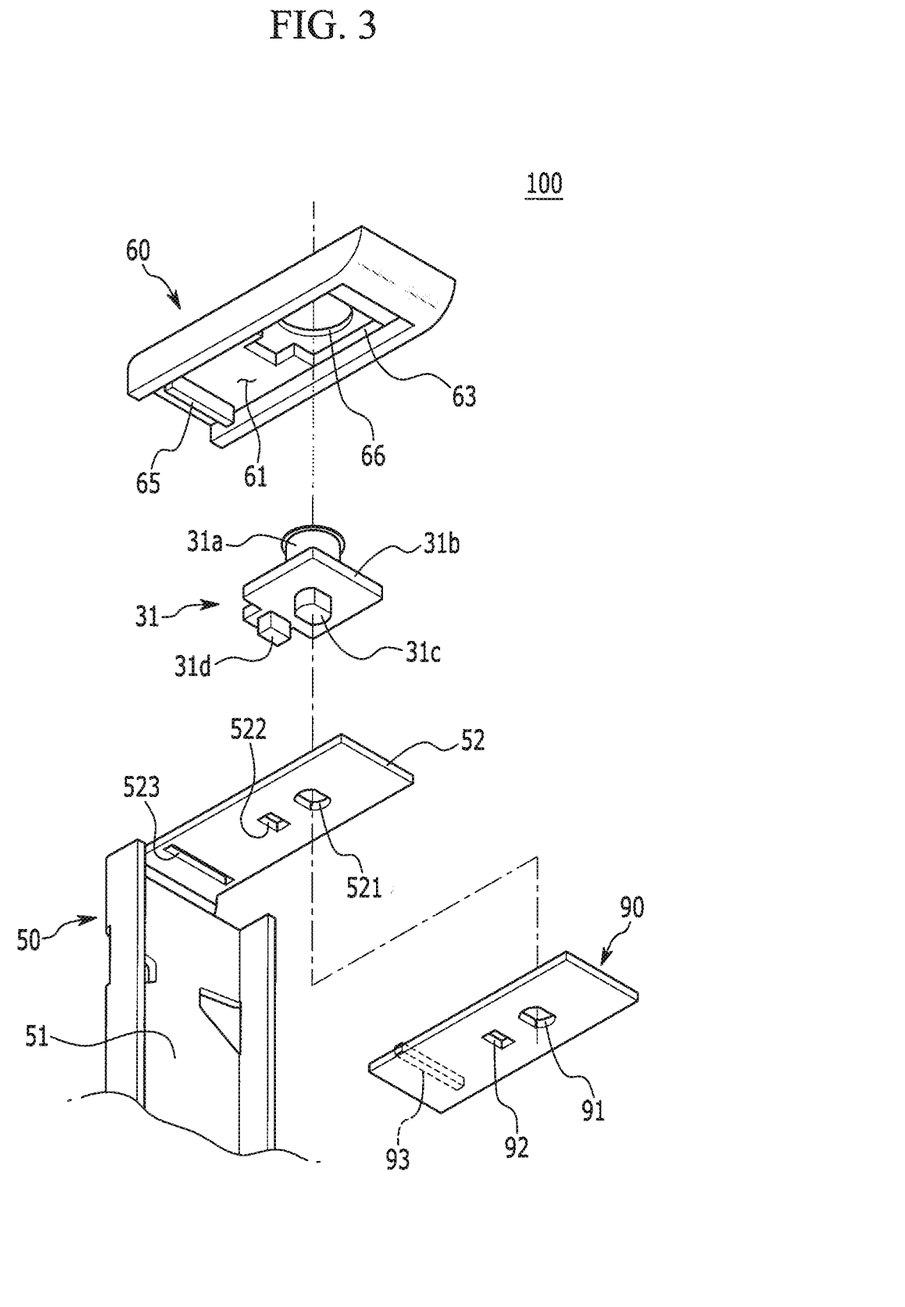
FIG. 3 is an exploded perspective view of a portion of the rechargeable battery of FIG. 1.
Figure 4:
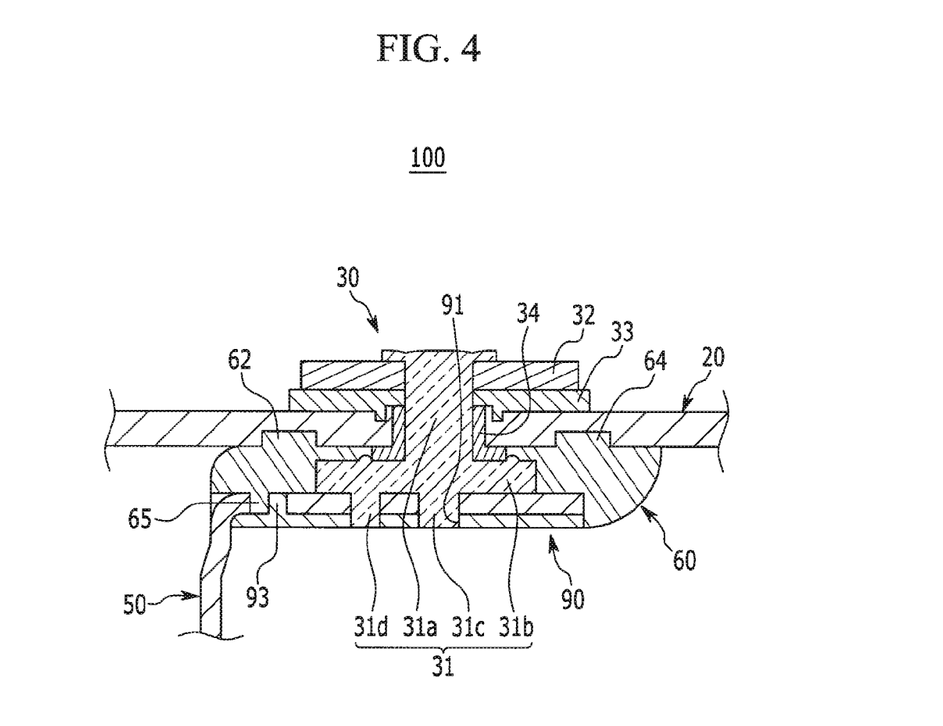
FIG. 4 is a partial cross-sectional view of the rechargeable battery of FIG. 1.

FIG. 3 is an exploded perspective view of a portion of the rechargeable battery 100, and FIG. 4 is a partial cross-sectional view of the rechargeable battery 100.

Referring to FIG. 3 and FIG. 4, the first rivet 31, according to one embodiment, may include a column 31a, a flange 31b, a first coupling protrusion 31c, and a second coupling protrusion 31d.

The first current collecting member 50, in one embodiment, includes the first electrode coupling unit 51 coupled with the first electrode 11, and the first terminal coupling unit 52 coupled with the first rivet 31.

The first terminal coupling unit 52 of the first current collecting member 50 may include a fuse unit including a first coupling groove 521, a second coupling groove 522, and a fuse hole 523. A cross-sectional area of the fuse unit where the fuse hole 523 is formed is smaller than that of other portions of the first terminal coupling unit 52. That is, in one embodiment, the first terminal coupling unit has a smallest cross-sectional area and greatest resistance at the fuse unit where the fuse hole 523 is formed, and is configured to melt at the portion of the fuse unit where the fuse hole 523 is formed under an abnormal current condition.

The first lower insulating member 60, in one embodiment, includes a first current collecting member coupling unit 61, fixing protrusions 62 and 64, a flange fixing groove 63, a protrusion 65 formed at the first current collecting member coupling unit 61, and a through-hole 66.

The supporting member 90, in one embodiment, includes a first fixing groove 91, a second fixing groove 92, and a supporting protrusion 93.

According to one embodiment, the column 31a of the first rivet 31 is inserted into the through-hole 66 formed at the first lower insulating member 60, and the first flange 31b may be fixed to the flange fixing groove 63 formed at the first lower insulating member 60.

In one embodiment, the column 31a of the first rivet 31 is rivet-coupled with the first terminal plate 32 and coupled with the cap plate 20 to be fixed such that the first lower insulating member 60 is coupled with the first rivet 31 to be fixed inside the case 26.

The first terminal coupling unit 52 of the first current collecting member 50 is inserted into the first current collecting member coupling unit 61, and the first coupling groove 521 of the first terminal coupling unit 52 may be coupled with the first coupling protrusion 31c formed at the first rivet 31.

In one embodiment, the second coupling groove 522 is coupled with the second coupling protrusion 31d of the first rivet 31, and the protrusion 65 formed at the first lower insulating member 60 is inserted in the fuse hole 523 formed at the first terminal coupling unit 52.

In one embodiment, the first coupling protrusion 31c and the first coupling groove 521, and the second coupling protrusion 31d and the second coupling groove 522, may be adhered by welding, or may be coupled by a friction-fit or press-fit.

The supporting member 90 according to one embodiment may be inserted into the first current collecting member coupling unit 61 of the first lower insulating member 60.

The first coupling protrusion 31c of the first rivet 31 is coupled to the first fixing groove 91 of the supporting member 90, and the second coupling protrusion 31d of the first rivet 31 may be coupled to the second fixing groove 92.

The supporting protrusion 93 of the supporting member 90 may be inserted into the fuse hole 523 of the first current collecting member 50.

Accordingly, the supporting member 90 according to an exemplary embodiment of the present invention is coupled with the first terminal coupling unit 52 of the first current collecting member 50 via the first rivet 31, thereby supporting the first current collecting member 50.

In one embodiment, the supporting protrusion 93 of the supporting member 90 is inserted into the fuse hole 523 formed at the first terminal coupling unit 52 such that the mechanical strength of a portion of the fuse unit of the first current collecting member 50 where the fuse hole 523 is formed may be reinforced.

Accordingly, the first current collecting member 50 formed with the fuse hole 523 may be stably fixed inside the case 26, and damage to the first current collecting member 50 (e.g., to the fuse unit where the fuse hole 523 is formed) by an external impact may be prevented or substantially prevented. As such, a rechargeable battery according to embodiments of the present invention is particularly suited for application in an electric vehicle or a hybrid electric vehicle.

According to an exemplary embodiment of the present invention, at least one of the supporting member 90 and the supporting protrusion 93 of the supporting member 90 is made of an insulating material.

Accordingly, a distance between fractured or broken surfaces of the fuse unit after an abnormal current is generated under the charge or discharge of the rechargeable battery 100 such that the circumference of the fuse hole 523 of the first current collecting member 50 is melted may be great enough because of the supporting protrusion 93 of the supporting member 90 such that the current does not flow.

Further, according to an exemplary embodiment, the supporting protrusion 93 of the supporting member 90 may be made of a high-resistance material in which only a current greater than a certain current (e.g. a critical current) will flow.

Accordingly, a current that may otherwise generate an arc between the fractured or broken surfaces after the abnormal current is generated under the charge or the discharge of the rechargeable battery 100 such that the fuse unit of the first current collecting member 50 where the fuse hole 523 is formed is melted may flow through the supporting protrusion 93 of the supporting member 90, and thereby an arc being generated between the fractured surfaces may be prevented or substantially prevented.

Figure 5:
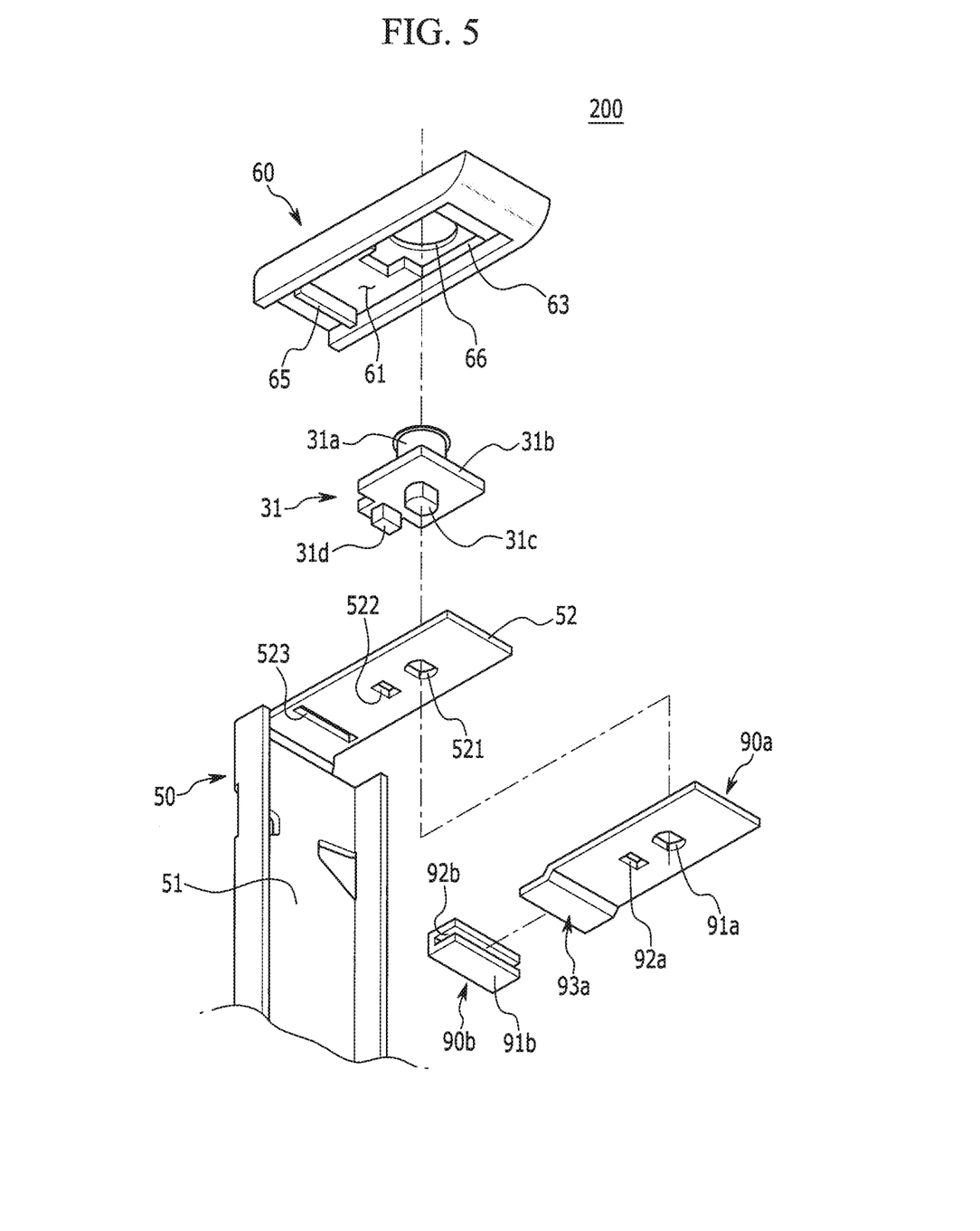
FIG. 5 is an exploded perspective view of a portion of a rechargeable battery according to another exemplary embodiment of the present invention.
Figure 6:
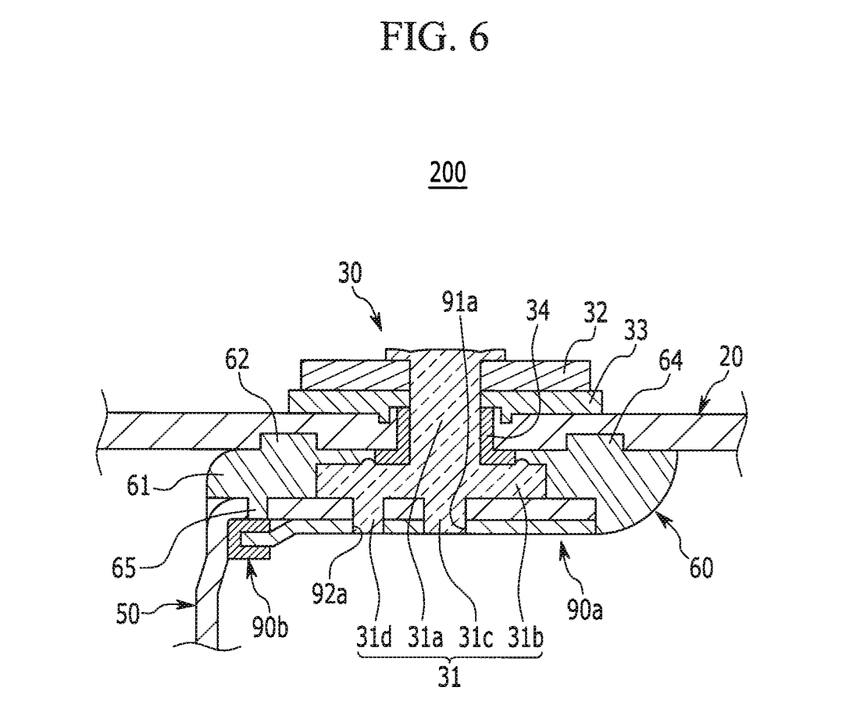
FIG. 6 is a partial cross-sectional view of the rechargeable battery of FIG. 5.

FIG. 5 is an exploded perspective view of a portion of a rechargeable battery according to another exemplary embodiment of the present invention, and FIG. 6 is a partial cross-sectional view of the rechargeable battery of FIG. 5.

Referring to FIG. 5 and FIG. 6, a rechargeable battery 200 according to another exemplary embodiment is the same or substantially the same as the rechargeable battery 100 described above, except for a supporting member 90a and a supporting cap 90b, and further description of the same structures is therefore omitted.

According to another exemplary embodiment, the supporting member 90a may include a first fixing groove 91a coupled to the first coupling protrusion 31c of the first rivet 31, and a second fixing groove 92a coupled to the second coupling protrusion 31d of the first rivet 31.

Also, a curved or offset portion 93a may be formed at one end of the supporting member 90a at a location corresponding to an end of the first current collecting member 50 having the fuse hole 523 formed therein.

The supporting cap 90b, according to one embodiment, is coupled to the end of the supporting member 90a having the curved portion 93a to support the fuse unit formed with the fuse hole 523.

In one embodiment, the supporting cap 90b includes a body unit 91b and a coupling groove 92b.

As shown in FIG. 5 and FIG. 6, the curved portion 93a formed at one end of the supporting member 90a may be inserted into the coupling groove 92b to be fixed to the supporting cap 90b.

Accordingly, the circumference of the fuse portion formed with the fuse hole 523 and the first current collecting member 50 may be supported by the supporting member 90a coupled with the supporting cap 90b such that the mechanical rigidity and strength of the first current collecting member 50 may be reinforced.

In one embodiment, the supporting cap 90b may be made of a high-resistance material through which only a current greater than a certain current (e.g., a critical current) will flow.

Accordingly, a current that may otherwise generate an arc between the fractured or broken surfaces after the abnormal current is generated under the charge or the discharge of the rechargeable battery 200 such that the fuse unit of the first current collecting member 50 where the fuse hole 523 is formed is melted may flow through the supporting cap 90b, and thereby an arc being generated between the fractured surfaces may be prevented or substantially prevented.

Figure 7:
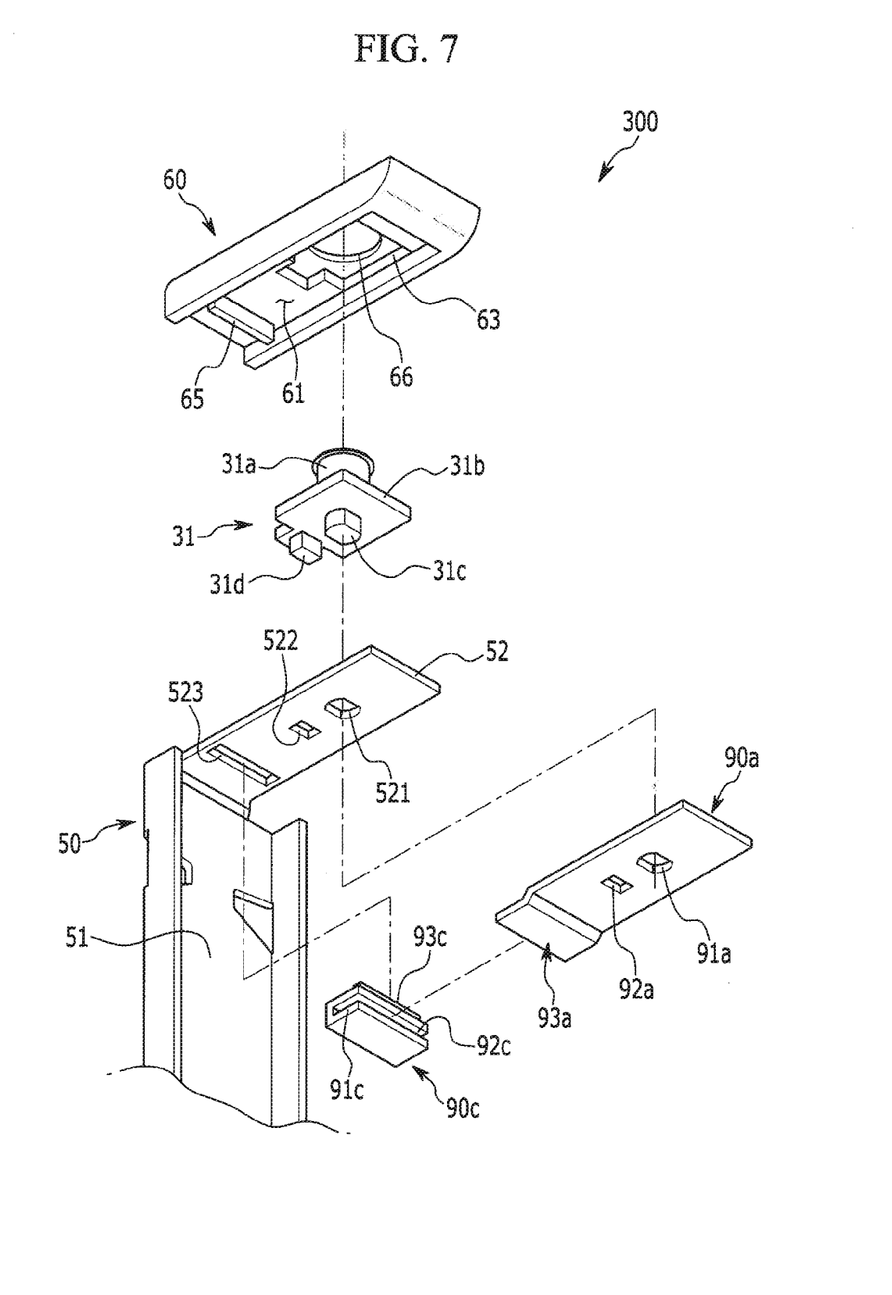
FIG. 7 is an exploded perspective view of a portion of a rechargeable battery according to another exemplary embodiment of the present invention.
Figure 8:
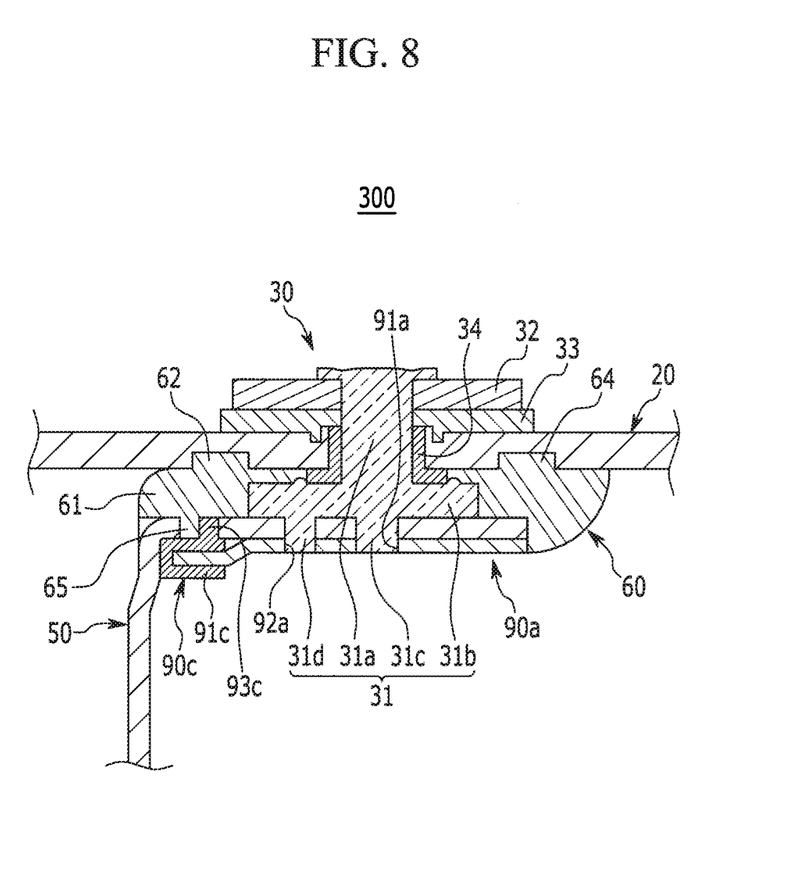
FIG. 8 is a partial cross-sectional view of the rechargeable battery of FIG. 7.

FIG. 7 is an exploded perspective view of a rechargeable battery according to another exemplary embodiment of the present invention, and FIG. 8 is a partial cross-sectional view of the rechargeable battery of FIG. 7.

Referring to FIG. 7 and FIG. 8, a rechargeable battery 300 according to another exemplary embodiment is the same or substantially the same as the rechargeable battery 200 described above except for a supporting cap 90c, and further description of the same structures is therefore omitted.

The supporting cap 90c according to another exemplary embodiment includes a body unit 91c, a coupling groove 92c, and a cap protrusion 93c.

The curved or offset portion 93a formed at one end of the supporting member 90a may be inserted in the coupling groove 92c, and the cap protrusion 93c may be inserted in the fuse hole 523 formed at the first terminal coupling unit 52 of the first current collecting member 50.

Accordingly, the first current collecting member 50 may be supported by the supporting member 90a and the supporting cap 90c formed with the cap protrusion 93c coupled with one end of the supporting member 90a such that the mechanical strength of the first current collecting member 50 may be reinforced.

According to an exemplary embodiment, the supporting cap 90c may be made of an insulating material.

Accordingly, a distance between fractured or broken surfaces of the fuse unit after an abnormal current is generated under the charge or the discharge of the rechargeable battery 300 such that the fuse unit at the circumference of the fuse hole 523 of the first current collecting member 50 is melted may be great enough by the cap protrusion 93c of the supporting cap 90c such that the current does not flow.

According to an exemplary embodiment, the supporting cap 90c may be made of a high-resistance material through which only a current greater than a certain current (e.g., a critical current) will flow.

Accordingly, a current that may otherwise generate an arc between the fractured or broken surfaces of the fuse unit after the abnormal current is generated under the charge or the discharge of the rechargeable battery 300 such that the fuse unit of the first current collecting member 50 where the fuse hole 523 is formed is melted may flow through the supporting cap 90c, and thereby an arc being generated between the fractured surfaces may be prevented or substantially prevented.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A rechargeable battery comprising:
an electrode assembly;
a case having an opening to receive the electrode assembly;
a cap plate covering the opening of the case;
a terminal extending through the cap plate between an interior and an exterior of the case and electrically connected to the electrode assembly;
a current collecting member coupled to the electrode assembly and the terminal and including a fuse unit in the interior of the case; and
a supporting member between the electrode assembly and the current collecting member and coupled to the current collecting member, the supporting member contacting and supporting the fuse unit, and a portion of the terminal extending through an opening of the current collecting member and being coupled to the supporting member.

2. The rechargeable battery of claim 1,
wherein the current collecting member comprises a terminal coupling unit coupled to the terminal, and an electrode assembly coupling unit coupled to the electrode assembly,
wherein the terminal coupling unit includes the fuse unit, and
wherein the supporting member is coupled to the terminal coupling unit.

3. The rechargeable battery of claim 2, wherein a cross-sectional area of the fuse unit is less than that of other portions of the terminal coupling unit.

4. The rechargeable battery of claim 3, wherein the fuse unit has an opening formed therein.

5. The rechargeable battery of claim 1, further comprising a lower insulating member between the cap plate and the current collector.

6. The rechargeable battery of claim 5, wherein the lower insulating member comprises a protrusion inserted in an opening of the fuse unit.

7. A rechargeable battery comprising:
an electrode assembly;
a case having an opening to receive the electrode assembly;
a cap plate covering the opening of the case;

a terminal extending through the cap plate between an interior and an exterior of the case and electrically connected to the electrode assembly;

a current collecting member coupled to the electrode assembly and the terminal and including a fuse unit in the interior of the case; and a supporting member between the electrode assembly and the current collecting member and coupled to the current collecting member, the supporting member contacting and supporting the fuse unit, wherein the current collecting member comprises a terminal coupling unit coupled to the terminal, and an electrode assembly coupling unit coupled to the electrode assembly, wherein the terminal coupling unit includes the fuse unit, wherein the supporting member is coupled to the terminal coupling unit, wherein a cross-sectional area of the fuse unit is less than that of other portions of the terminal coupling unit, wherein the fuse unit has an opening formed therein, and wherein the supporting member comprises a supporting protrusion inserted in the opening.

8. The rechargeable battery of claim 7, wherein the supporting protrusion comprises an insulating material.

9. A rechargeable battery comprising:

an electrode assembly;

a case having an opening to receive the electrode assembly;

a cap plate covering the opening of the case;

a terminal extending through the cap plate between an interior and an exterior of the case and electrically connected to the electrode assembly;

a current collecting member coupled to the electrode assembly and the terminal and including a fuse unit in the interior of the case;

a supporting member between the electrode assembly and the current collecting member and coupled to the current collecting member, the supporting member contacting and supporting the fuse unit; and a supporting cap coupled to the supporting member and supporting the fuse unit.

10. The rechargeable battery of claim 9, wherein the supporting cap includes a body unit and a coupling groove formed in the body unit, and wherein the supporting member is coupled to the supporting cap in the coupling groove.

11. The rechargeable battery of claim 9, wherein the fuse unit has an opening formed therein, and the supporting cap includes a coupling protrusion inserted in the opening.

12. The rechargeable battery of claim 9, wherein the supporting cap comprises an insulating material.

* * * * *